US011364672B2

(12) United States Patent
Tabanelli

(10) Patent No.: US 11,364,672 B2
(45) Date of Patent: Jun. 21, 2022

(54) MACHINE FOR CONDITIONING PIPES MADE OF THERMOPLASTIC MATERIAL AND RELATIVE METHOD

(71) Applicant: SICA S.p.A., Alfonsine (IT)

(72) Inventor: Giorgio Tabanelli, Cotignola (IT)

(73) Assignee: SICA S.P.A., Alfonsine (IT)

( * ) Notice: Subject to any disclaimer, the term of this patent is extended or adjusted under 35 U.S.C. 154(b) by 467 days.

(21) Appl. No.: 16/330,256

(22) PCT Filed: Sep. 19, 2017

(86) PCT No.: PCT/IB2017/055659
§ 371 (c)(1),
(2) Date: Mar. 4, 2019

(87) PCT Pub. No.: WO2018/073671
PCT Pub. Date: Apr. 26, 2018

(65) Prior Publication Data
US 2019/0202108 A1 Jul. 4, 2019

(30) Foreign Application Priority Data
Oct. 18, 2016 (IT) .......................... 102016000104716

(51) Int. Cl.
*B29C 57/04* (2006.01)
*B29C 31/00* (2006.01)
(Continued)

(52) U.S. Cl.
CPC ............ *B29C 57/04* (2013.01); *B29C 31/002* (2013.01); *B29C 57/02* (2013.01); *B29K 2101/12* (2013.01)

(58) Field of Classification Search
None
See application file for complete search history.

(56) References Cited

U.S. PATENT DOCUMENTS

| 3,849,052 A | 11/1974 | Gordon |
| 3,852,015 A | 12/1974 | Stansbury |

(Continued)

FOREIGN PATENT DOCUMENTS

| CN | 101821072 A | 9/2010 |
| CN | 104029378 A | 9/2014 |

(Continued)

OTHER PUBLICATIONS

Chinese Office Action dated Jul. 24, 2020 from counterpart Chinese Patent Application No. 201780058584.

(Continued)

*Primary Examiner* — Jacob T Minskey
*Assistant Examiner* — Adrien J Bernard
(74) *Attorney, Agent, or Firm* — Shuttleworth & Ingersoll, PLC; Timothy Klima

(57) ABSTRACT

A machine for conditioning pipes made of thermoplastic material, including a station for accumulating pipes made of thermoplastic material, at which the pipes are positioned side by side and parallel to one another and with a first predetermined direction of longitudinal extension, a plurality of operational stations for conditioning respective ends of the pipes made of thermoplastic material, positioned side by side along a second predetermined direction at right angles to the first direction, these operational stations including a station for forming bells on the ends, a positioning device designed to pick up a group of pipes for transferring it from one to the other of the above-mentioned stations.

12 Claims, 9 Drawing Sheets

(51) Int. Cl.
  *B29K 101/12* (2006.01)
  *B29C 57/02* (2006.01)

(56) References Cited

U.S. PATENT DOCUMENTS

| | | | |
|---|---|---|---|
| 3,890,079 A | | 6/1975 | Slater |
| 3,932,094 A | | 1/1976 | Korff et al. |
| 4,276,010 A | * | 6/1981 | Shartzer ................ B29B 13/025 |
| | | | 425/143 |
| 4,323,337 A | * | 4/1982 | Korff .................... B29C 31/002 |
| | | | 264/297.5 |
| 5,620,719 A | | 4/1997 | Savioli |
| 5,855,930 A | | 1/1999 | Savioli |

FOREIGN PATENT DOCUMENTS

| | | |
|---|---|---|
| CN | 205202150 U | 5/2016 |
| DE | 2355468 A1 | 5/1974 |
| EP | 0684124 A1 | 11/1995 |
| EP | 0700771 A1 | 3/1996 |
| EP | 2368693 A1 | 9/2011 |

OTHER PUBLICATIONS

Indian Office Action dated Mar. 16, 2021 from related Indian Patent Application No. 201927008473.
International Search Report and Written Opinion dated Dec. 8, 2017 for counterpart PCT Application No. PCT/IB2017/055659.

* cited by examiner

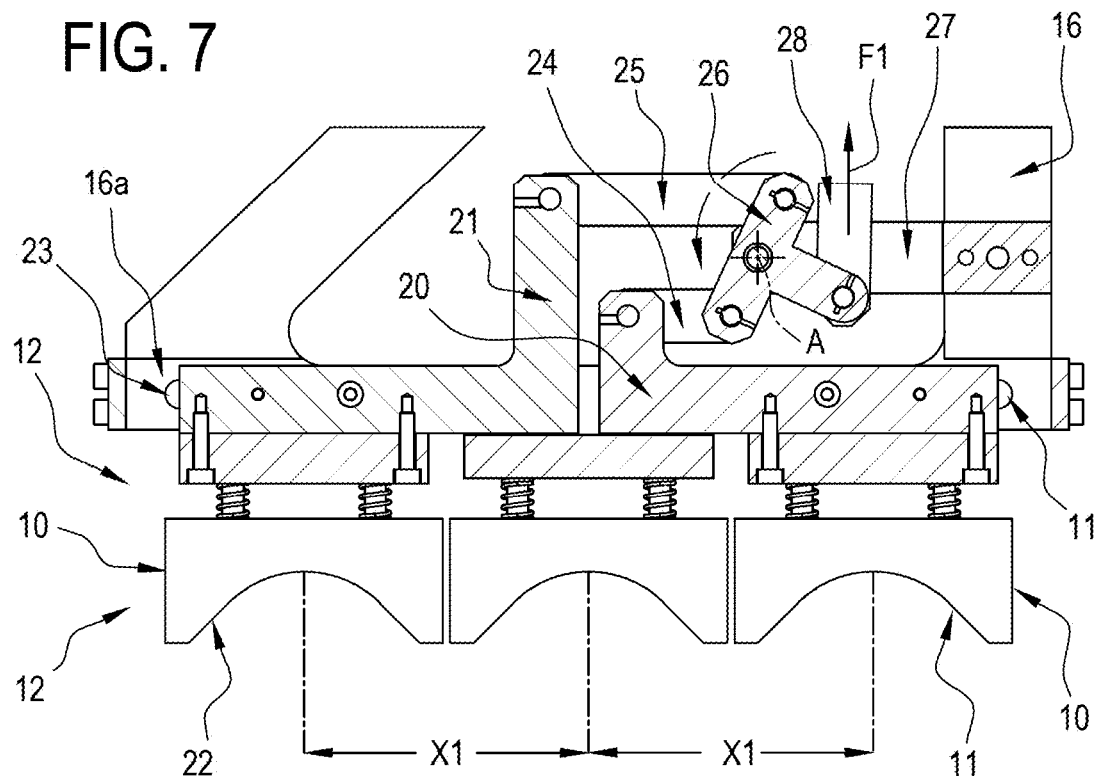
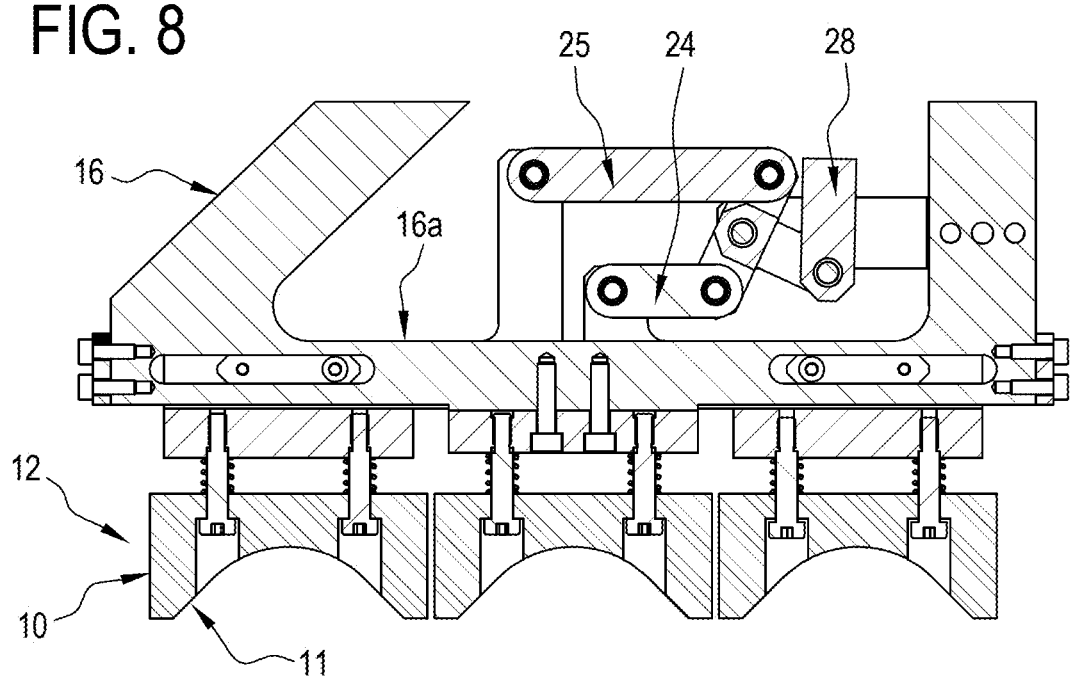

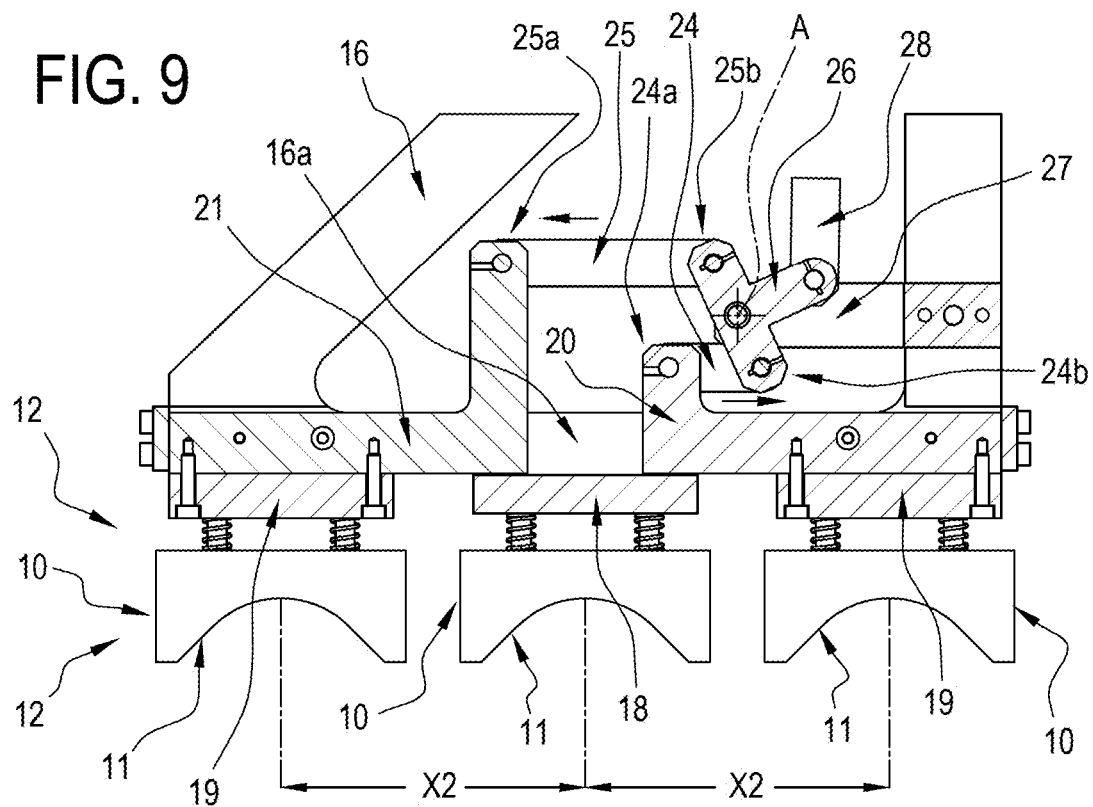
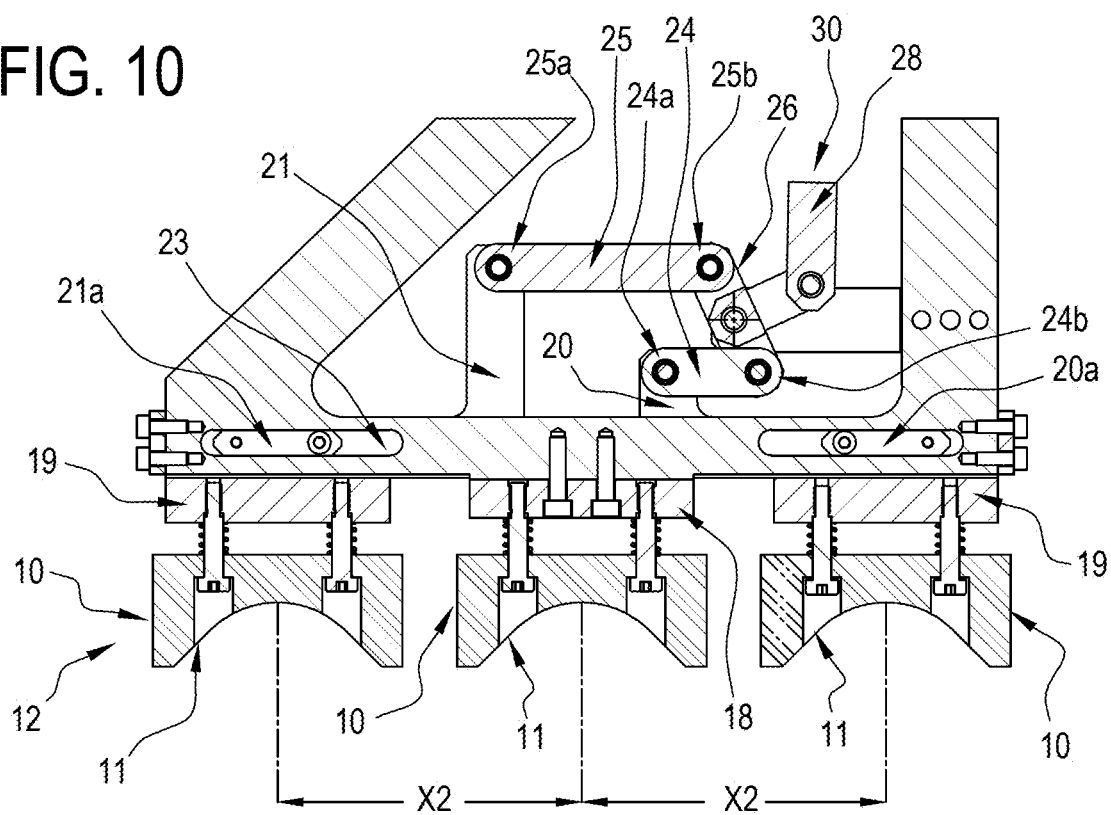

MACHINE FOR CONDITIONING PIPES MADE OF THERMOPLASTIC MATERIAL AND RELATIVE METHOD

This application is the National Phase of International Application PCT/IB2017/055659 filed Sep. 19, 2017 which designated the U.S.

This application claims priority to Italian Patent Application No. 102016000104716 filed Oct. 18, 2016, which application is incorporated by reference herein.

This invention relates to a machine for conditioning pipes made of thermoplastic material.

More specifically, this invention relates to a belling machine, that is, designed to form end bells in the pipes made of plastic material.

This invention also relates to a method for conditioning pipes made of thermoplastic material.

In the production of pipes made of thermoplastic material designed for making pipes for delivering and/or discharging fluids (used, for example, in building works, drainage networks, drinking water distribution networks and sewerage networks) belling machines are used for shaping an end portion of the pipes into the characteristic "bell" shape, which has a wider shape relative to the normal diameter of the pipe (the so-called "bell and spigot") and serves to connect together in succession the pipes which form the conduit. An unshaped end of a pipe is normally inserted in the bell-shaped end of the pipe upstream or downstream in the conduit.

The belling machine, which are generally automatic, can be installed in an extrusion line and, in line, receive the pipes or pieces of cut pipe to be processed.

The majority of belling machines make the bell on the end of the pipe with the hot forming process. The belling machines are equipped with at least one oven for heating the end of the pipe to be shaped and forming equipment which, by using a suitable mould, forms the heated end of the pipe into the shape of a bell.

A widespread application is the shaping of the end of the pipe by moulding with a spindle, also called a pad (in particular in the case of uPVC pipes, that is to say, unplasticized polyvinyl chloride). The spindle, or pad, reproduces the internal shape of the bell to be formed. In order to form the end of the pipe in the shape of a bell, the pad is inserted inside the pipe at that end to be shaped.

Amongst the belling machines of the conventional type should be noted the type of belling machine illustrated in patent document EP 0 684 124, by the same Applicant as this invention.

The above-mentioned patent document describes the configuration of an automatic belling machine of significant interest for optimising the production process, as well being suitable for processing short pipes (up to 0.5 m, to which it should be added the length of the bell). Typically it consists of various stations where the pipe is transported to perform the various operational steps.

The first station receives the cut pipe along the extrusion line. In this station, by using a suitable positioning device, the pipe is moved longitudinally and separated from the pipe following it and then stopped in a precise position always aligned with the axis of extrusion.

From this station the pipe is then moved transversely to place it at the other processing stations.

Thus, more in detail, the pipe coming from the extrusion line and cut into pieces is then positioned in two heating stations and in a forming station which are placed side by side.

When the pipe is positioned in the first heating station, advantageously the oven of the latter advances, from an initial withdrawn position, towards the pipe until enclosing the end of the pipe to be heated inside it. At the end of the first heating process, the oven withdraws and the freed pipe is moved transversely and positioned in front of the second heating station, in which are carried out the same movements of the first heating station.

After the heating process, with the second oven withdrawn, the pipe is positioned at the forming station and then clamped and locked by clamps, before the forming spindle, advancing, penetrates the pipe. Together with the spindle, a forming chamber, made in different types, also as a function of the material of the pipe being processed, feeds towards the pipe.

More specifically, in the processing of pipes made of polypropylene (PP), which are typical used for drains of buildings, the forming of the bell is conveniently achieved with an apparatus illustrated, for example, in patent document EP 0 700 771 in the name of the same Applicant as this invention; in this apparatus the forming chamber comprises different elements: outer moulds (for forming the outer shape of the bell), inner pad (for shaping and calibrating the inner surface of the bell) and a flange sliding on the pad (for shaping the edge of the bell). The heating oven may also be made of different types as a function of the material of the pipe being processed. For the processing of PP pipes the ovens are normally of the external contact type, that is to say, consisting of metal clamps, with a semi-circular shape, which are heat-controlled, that are closed on the outer surface of the end portion of the pipe to form the bell.

When both the forming and the cooling of the bell have been completed, the forming chamber retracts and the pipe, freed from the respective clamp is moved transversely to be discharged outside the belling machine.

A convenient dividing of the heating process has been performed with the solution just described with the aim of optimising the timing of the treatment cycle.

In order to further increase the productivity of belling machines, multi-belling solutions have been adopted, that is to say, wherein the pipes, after the positioning station, can be picked up in groups of two or more pipes each. These groups of pipes are then moved simultaneously and simultaneously processed in stations for heating and forming-cooling the bell.

For reasons of size and complexity of the heating devices and forming moulds, this solution is normally used only for processing small diameter pipes, that is, usually with diameters of not greater than 160 mm.

In the belling machines prepared for multi-belling, the above-mentioned device for positioning the pipes, which has the purpose of transferring the pipes between the various processing stations, is therefore configured to manage not individual pipes but groups of pipes, for example groups of three pipes, as usually occurs for the smaller diameters, for example with diameter less than 125 mm.

The belling machines prepared for multi-belling, due to the multiplicity of devices designed to process simultaneously, in each station, each pipe of the group, have a considerable overall size, particularly in the direction transversal to the direction of extrusion.

More specifically, the increase in the proportionally greater overall size derives from the multiplication of the stations for forming the pipe, due to the fact that at the stations there is a widening of the shape of the pipe, due to the formation of the bell.

A excessive transversal size could making the machine difficult to transport and difficult to install in the extrusion line, thereby also making the marketing difficult.

Moreover, a high transversal extension of the machine involves the drawback of long paths for transferring the pipes from one station to the next, thereby adversely affecting the overall processing time/cycle.

The aim of this invention is to provide a belling machine and method which overcome the drawbacks of the prior art.

A further aim of this invention is to provide a machine for belling pipes made of thermoplastic material set up for multi-belling which allows for high production speeds.

These aims and others, which are more apparent in the description which follows, are achieved, in accordance with this invention, by a belling machine and a method for belling comprising the technical features described in one or more of the appended claims.

The technical features of the invention, according to the aforesaid aims, are clearly disclosed in the claims below, and their advantages will become more evident in the detailed description that follows, with reference to the accompanying drawings which represent one embodiment provided as a non-binding example, wherein:

FIG. 7 is a cross section view according to the line VII-VII of FIG. 5;

FIG. 8 is a cross section view according to the line VIII-VIII of FIG. 5;

FIG. 9 is a cross section view according to the line IX-IX of FIG. 6;

FIG. 10 illustrates a cross-section according to the plane X-X of FIG. 6;

Figure 1:
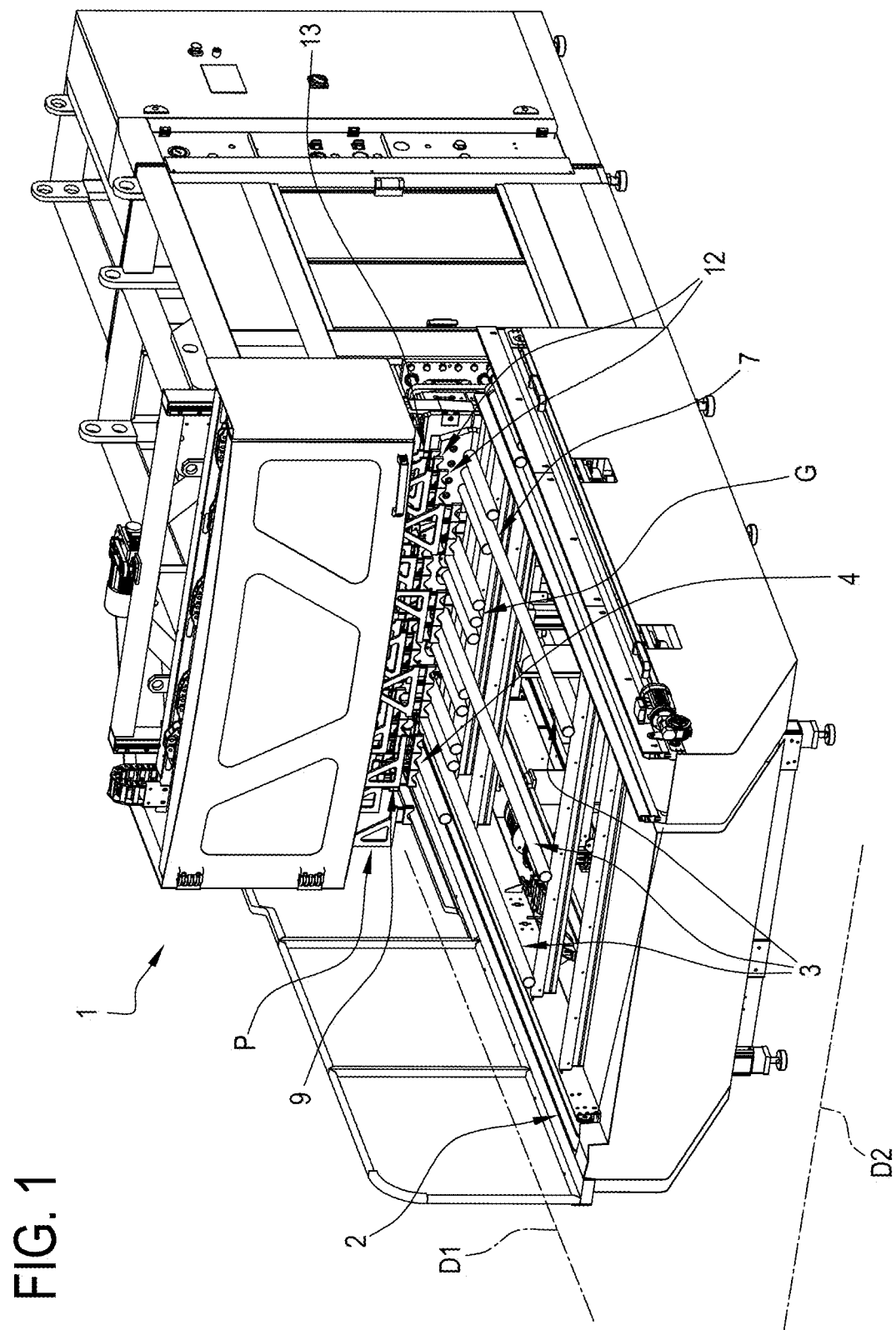
FIG. 1 is schematic perspective view of a preferred embodiment of a machine for conditioning pipes made of thermoplastic material according to the invention.

With reference to FIG. 1, the numeral 1 denotes in its entirety a machine for processing pipes made of thermoplastic material, in particular a so-called belling machine, that is to say, designed to form respective end bells, made in accordance with this invention.

As illustrated in FIG. 1, the machine 1 has a conveyor belt 2, extending along a predetermined first rectilinear direction D1, along which are fed pipes 3 coming from an extrusion line, not illustrated, located upstream of the machine 1.

Figure 2:
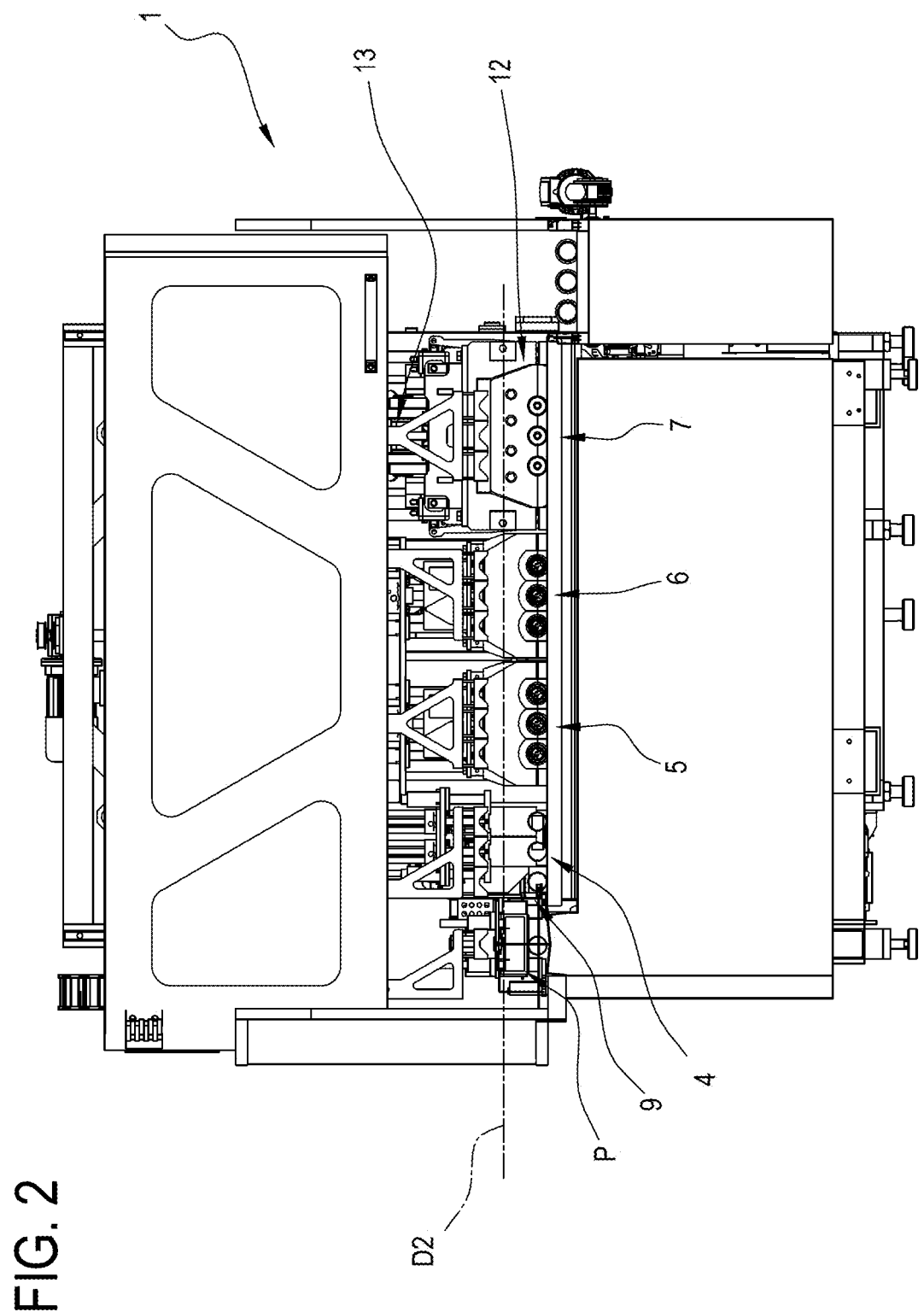
FIG. 2 is a schematic front elevation view, with some parts cut away to better illustrate others, of the machine of FIG. 1.

As illustrated in FIG. 2, the machine 1 has a plurality of operating stations, described in more detail below, positioned side by side along a predetermined second direction D2 at right angles to the above-mentioned first direction D1.

In this description the term "pipe" means, preferably, a piece of pipe made in known manner by cutting from a continuous pipe, produced by extrusion of thermoplastic material.

The direction D1 also constitutes a longitudinal direction of extension of the extruded pipe as well as of the pipes 3 made from it, fed along the belt 2.

Again with reference to FIG. 2, adjacent to the conveyer belt 2 the machine 1 comprises a station 4 for accumulation of pipes 3 made of thermoplastic material coming from the belt 2.

At the accumulation station 4, the pipes 3 are arranged side by side and parallel to each other and to the above-mentioned first predetermined direction D1 of longitudinal extension.

The machine 1 comprises an arm P for picking up designed to pick up the individual pipes 3 from the conveyor belt 2 and place them at the above-mentioned accumulation station 4 in respective predetermined positions.

As illustrated in FIG. 2, to the right of the accumulation station 4 the machine 1 has a first station 5 and a second station 6 for heating the pipes 3.

To the right of the second heating station 6, the machine 1 comprises a forming station 7 at which one end 3a of the pipe 3 is shaped in the form of a bell. The station 7 for forming in the shape of a bell is also known as the belling station.

The heating stations 5, 6 comprise respective heating devices, of known type and not described in further detail, designed to heat the ends 3a of the pipes 3 abutted against them.

There are, advantageously, two heating stations 5, 6 in order to optimise the production capacity of the machine 1.

In other words, as mentioned in the introduction, the dividing of the heating process advantageously makes it possible to increase the efficiency of the belling machine 1, thereby using to the maximum extent the productivity of the forming station 7 thanks to the drastic reduction in the length of waiting times for heating the ends 3a of the pipes 3.

As illustrated in FIG. 1, the machine 1 comprises a surface 8 for supporting and sliding the pipes 3, along the surface 8 the pipes 3 being held in a flat horizontal position and moreover having the possibility of sliding to position, in succession, at the various operating stations 5, 6 and 7.

The surface 8 is of substantially known type and will not therefore be described further.

The machine 1 comprises, as shown in FIGS. 1 and 2, a positioning device 9 designed to pick up groups G of pipes 3 at the accumulation station 4 and transferring them between the various operating stations 5, 6, 7 of the machine 1, making them slide on the surface 8.

The positioning device 9 comprises a plurality of gripping elements 10, designed to put in contact above with the pipes 3.

Each gripping element 10 has a contact portion 11 with a concave shape, such as to guarantee an effective contact with pipes of different diameters.

The above-mentioned gripping elements 10 are arranged side by side in succession according to the second predetermined direction D2, equal in number to the number of pipes 3 of the group G, thereby defining respective racks 12.

In the example embodiment of the machine 1 illustrated in the accompanying drawings, the group G is formed by three pipes 3 and, consequently, there are also three gripping elements 10 making up each rack 12.

As illustrated in FIG. 1, the positioning device 9 comprises many carriages 13 for supporting the above-mentioned racks 12, the carriages 13 being movable between the various stations 4, 5, 6, 7 on respective tracks, of known type and not illustrated in detail, along the predetermined second direction D2.

In the embodiment illustrated in the accompanying drawings, each carriage 13 supports four racks 12 positioned aligned with each other along the above-mentioned first direction D1, in such a way that the corresponding gripping elements 10 of each rack 12, engaging with the three pipes 3 of a group G, keep the pipes 3 parallel to each other and to the first direction D1.

Figure 3:
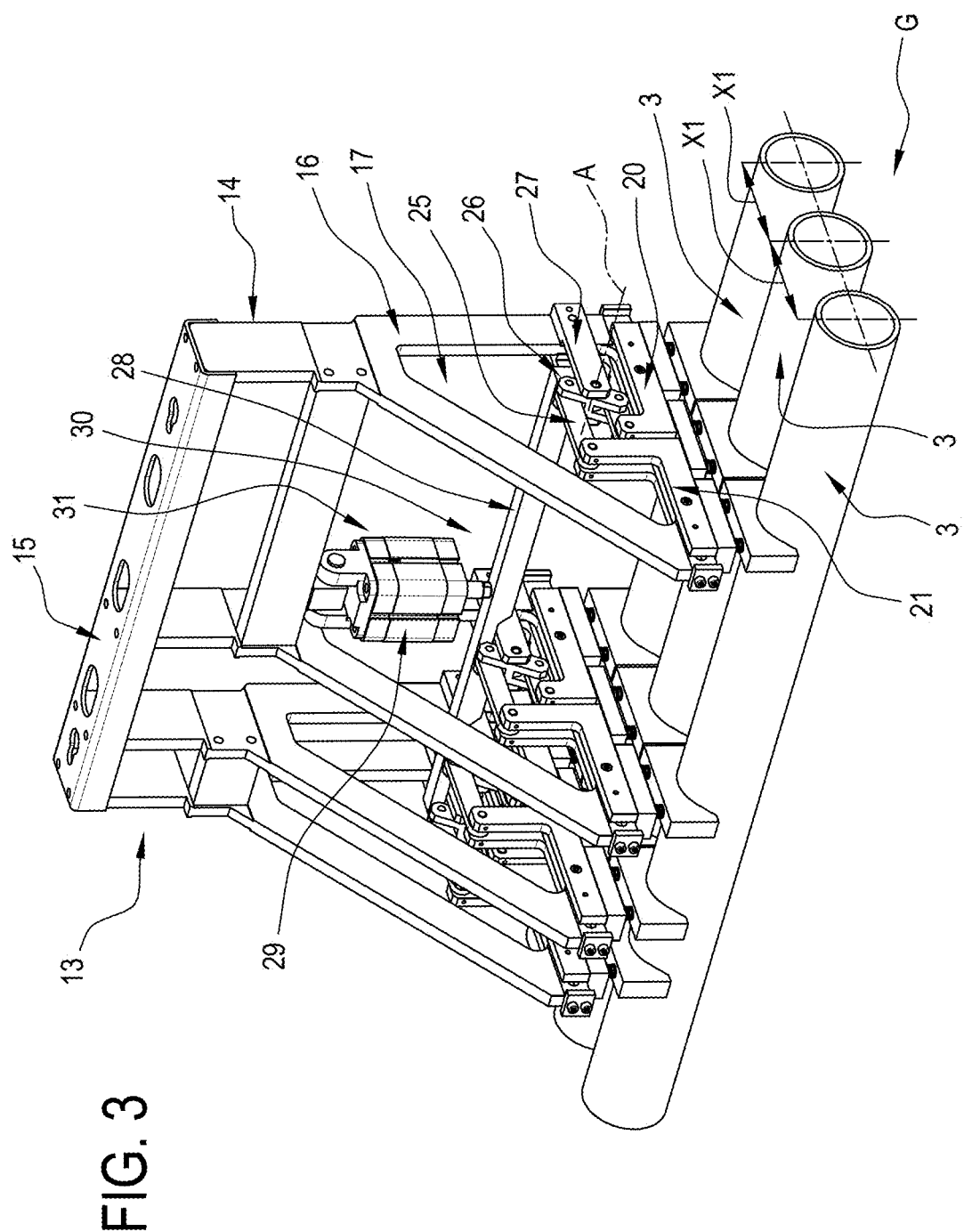
FIGS. 3 and 4 are schematic perspective views from above of a detail of the machine of FIG. 1 in two different configurations of use, respectively.

More specifically, as shown in FIG. 3, each carriage 13 comprises a frame 14 for supporting racks 12.

As illustrated in FIG. 3, the frame 14 comprises an upper beam 15 and a plurality of arms 16 which extend from beneath the beam 15.

The arms 16, one for each rack 12, have a triangular shape, with a central opening 17 designed for the passage of mechanical components.

The rake 12 and more specifically the gripping elements 10 which define it, are engaged with the arm 16 at a relative lower side 16a.

More specifically, as clearly shown in FIGS. 7 and 8, the gripping elements 10 are supported elastically by respective runners 18, 19.

The runner 18 of the gripping element 10 is fixed in an integral manner to the lower side 16a of the arm 16.

The runner 18 is therefore, relative to the fixed frame 14, a fixed runner.

The runners 19 of the two outer gripping elements 10 are fixed to two respective sliders 20, 21 slidably supported by the lower side 16a of the arm 16.

More in detail, as shown in FIG. 8, the two sliders 20, 21 have respective engagement portions 20a, 21a, slidably inserted inside guide slots 22, 23 made in the lower side 16a of the arm 16.

The lower side 16a, also thanks to the above-mentioned guide slots 22, 23, define a rectilinear portion forming a sliding guide of the two runners 19.

The runners 19 are therefore, as described in more detail below, movable runners relative to the frame 14.

The L-shaped sliders 20, 21 emerge above the lower side 16a of the arm 16, to extend in part inside the above-mentioned opening 17 with respective portions.

At the above-mentioned relative upper portions, first longitudinal ends 24a, 25a of two respective first and second connecting rods 24, 25 are pivoted on the sliders 20, 21.

In the vicinity of the second ends 24b, 25b opposite to those just mentioned, the connecting rods 24, 25 are pivoted on a crank 26.

The crank 26 is advantageously T-shaped.

The crank 26 is in turn rotatably supported, together with relative pivot axis A, by a bracket 27 fixed to the triangular arm 16 and projecting inside the above-mentioned opening 17.

The crank 26, as shown for example in FIG. 3, is operatively connected to a drive rod 28 which extends longitudinally parallel to the first direction D1.

Each carriage 13 advantageously has a single rod 28 which is designed to engage with all the racks 12 present in the carriage 13.

The rod 28 is operatively connected to the mobile part of an actuator element 29.

Advantageously, according to the embodiment illustrated in the accompanying drawings, the actuator unit 29 is of a pneumatic type.

Alternatively, according to possible variant embodiments, not illustrated, the actuator unit 29 is of an electrical or hydraulic type.

If two positions of the actuator unit 29 are requested (as in the case illustrated in the accompanying drawings), a pneumatic type actuator is advantageously opted for.

When, on the other hand, many positions are required, an electrical or hydraulic actuator is preferable due to the ease of exact control of its movement, for example by an encoder position transducer.

The above-mentioned rod 28, crank 26, connecting rods 24, 25 and sliders 20, 21 define, in their entirety, a kinematic mechanism 30 for control of the runners 19 and the relative gripping elements 10 connected to them.

The kinematic control mechanism 30 is operatively interposed between the actuator unit 29 and the movable runners 19, slidable as one with the respective gripping element 10.

The kinematic control mechanism 30 and the actuator unit 29 define, in their entirety, the means 31 for relative movement of the gripping elements 10 of the rake 12, configured for varying the mutual distance of the gripping elements 10 and the pipes 3 which are engaged with them.

FIGS. 7 and 9 illustrate the sliding runners 19 movable along the lower side 16a of the arm 16, following operation of the actuator unit 29.

More in detail, starting from the configuration illustrated in FIG. 7, in which the fixed and mobile runners 18, 19 are in a condition of moving towards each such as to define a predetermined first centre-to-centre distance X1 between the pipes 3 engaged with the respective gripping elements 10, the actuator unit 29 is driven which withdraws the relative mobile part in the direction of the arrow F1.

The movement in the direction of the arrow F1 of the mobile part of the actuator unit 29 (not shown in the drawing), by means of the drive rod 28, induces in the crank 26 connected to it an anticlockwise rotation about its pivot axis A.

The rotation of the crank 26 is to be considered anticlockwise with reference to FIG. 7.

The anticlockwise rotation of the crank 26 thus causes the first and second connecting rods 24, 25 to move in the direction of the relative arrows indicated in FIG. 9, thereby driving the respective sliders 20, 21.

Following the pulling effected by the connecting rods 24, 25 the sliders 20, 21 move in a sliding fashion with respect to the guide constituted by the lower side 16a of the arm 16, moving away from each other.

Since each slider 20, 21 is connected, by a respective movable runner 19, to a respective gripping element 10, the latter will also undergo a corresponding motion away from each other, as illustrated in FIG. 9.

For this reason, considering FIGS. 9 and 10, the fixed and mobile runners 18, 19 are in a condition of moving away from each other such as to define a predetermined second centre-to-centre X2 between the pipes 3 engaged with the respective gripping elements 10.

Figure 4:
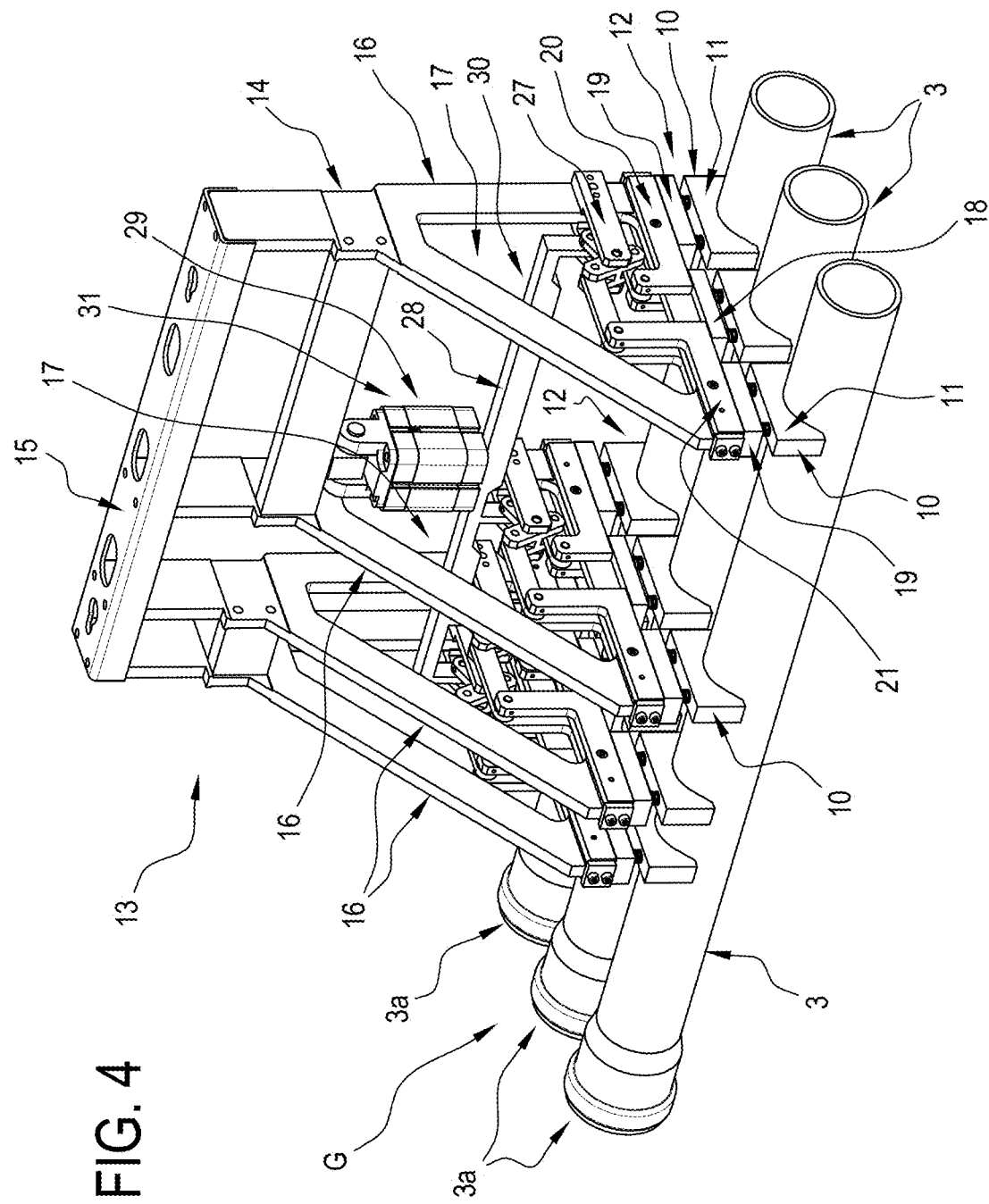
Figure 5:
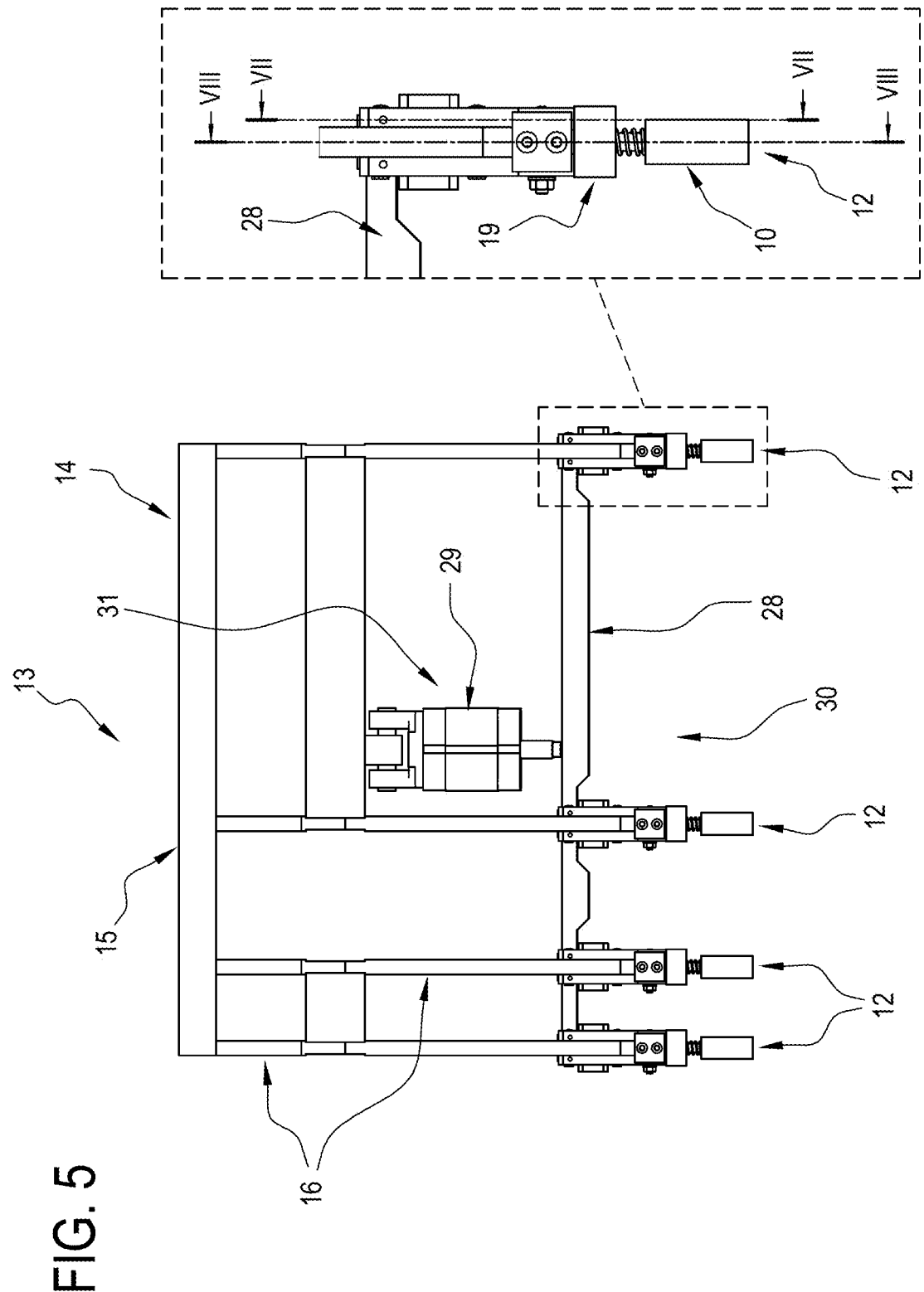
FIG. 5 is a schematic side elevation view, with some parts cut away, of the detail of FIG. 3.
Figure 6:
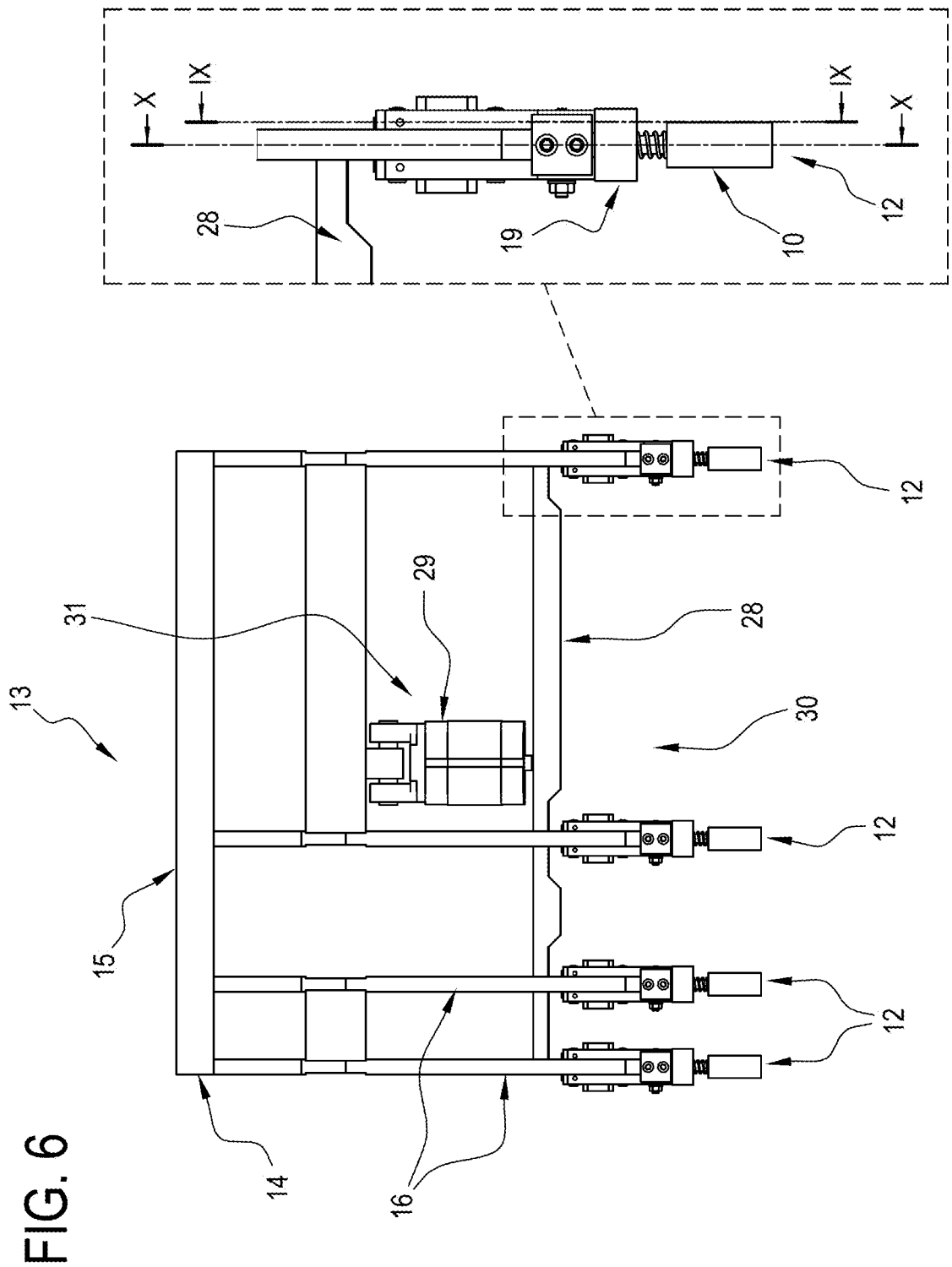
FIG. 6 is a schematic side elevation view, with some parts cut away, of the detail of FIG. 4.

FIGS. 3 and 4 illustrate with reference to an entire carriage 13 configurations described above with reference to a single rack 12.

More in detail, FIG. 3 shows the carriage 13 engaging with a group G of three pipes 3 located at a mutual distance from each other defined by the first predetermined centre-to-centre distance X1.

FIG. 4 illustrates, on the other hand, the same carriage 13 which engages with the same group G of three pipes 3, and bells have been formed on the pipes 3 on the respective ends 3a, located at a different mutual distance to each other defined by the predetermined second centre-to-centre distance X2.

Advantageously, the second predetermined centre-to-centre distance X2 is greater than the first predetermined centre-to-centre distance X1.

With reference to FIGS. 3, 4, the movement of the movable runners 19 and the relative gripping elements 10 described above with reference to a rack 12 is to be considered here as performed by all the four racks 12 supported by the carriage 13.

In other words, with reference to the carriage 13, each rack 12 has respective movable gripping elements 10 which move in a synchronised fashion with the corresponding gripping element 10 of the adjacent rake 12.

The synchrony is achieved by the kinematic mechanism 30, the actuation of which is given by a rod 28 shared by all the racks.

The above-mentioned actuator elements 29 and kinematic control mechanisms 30 define together, for the positioning device 9, means 31 for relative movement of the gripping elements 10.

As described above, the movement means 32 are designed to vary the mutual distance of the gripping elements 10 and of the pipes 3 which engage with them in relative groups G, during the transfer between the various stations 4, 5, 6, 7 of the machine 1.

A brief description is now given of the method according to the invention, showing by way of an example the actuation steps with reference to the preferred embodiment of the machine 1 illustrated in the accompanying drawings.

The method for conditioning a pipe 3 made of thermoplastic material according to this invention comprises a plurality of steps.

A first step is that of feeding a plurality of pipes 3 of equal diameter to the accumulation station 4 and consequently positioning the pipes 3 in groups G of predetermined number, for example three as shown in the accompanying drawings.

In the above-mentioned group G, the pipes 3 are positioned alongside and parallel to each other, spaced apart from each other by a first predetermined centre-to-centre distance X1.

A subsequent step is to transfer a group G of pipes 3 from the accumulation station 4 to a first operating station at which the pipes 3 are subjected to a first conditioning. According to the embodiment illustrated, the first operating station is defined by a first station 5 for heating the end 3a of the pipes 3.

Again with reference to the accompanying drawings, this is followed by the transfer the group G to another heating station 6 where perfects the heating of the ends 3a of the pipes 3.

The group G of pipes 3 is therefore transferred to a further operating station 7 at which each pipe 3 is subjected to a second conditioning: the forming of the relative end 3a, previously heated, into the shape of a bell.

The method according to the invention comprises the step of varying the mutual distance between the pipes 3 of the group G from the above-mentioned predetermined first centre-to-centre distance X1, the distance at which they find themselves, for example, at the accumulation station 4, to a predetermined second centre-to-centre distance X2, during transfer of the group G of pipes 3 from one of the above-mentioned stations 4, 5, 6 to another of the stations 5, 6, 7.

Advantageously, the above-mentioned variation in the distance between the pipes 3 occurs between a smaller centre-to-centre distance X1, at, for example, the heating stations 5, 6 and a larger centre-to-centre distance X2 at the forming station 7.

The method according to the invention lends itself, conveniently, to performing the mutual moving away of the pipes 3 being gripped to move them from a centre-to-centre distance X1 to a centre-to-centre distance X2 which is greater during, or at least partly simultaneous with, the translational movement of the group G of pipes 3 being gripped, from the heating station 6 to the belling station 7. In this way, the action for varying the centre-to-centre distance does not adversely affect, that is to say, does not increase, the time of the machine work cycle.

Illustrated below are certain functional aspects of the machine 1 for conditioning pipes made of thermoplastic material according to the invention, showing by way of example the work cycle by the preferred embodiment illustrated in the accompanying drawings.

The configuration illustrated in FIG. 3 shows a carriage 13 whilst it supports a group G of three pipes 3, wherein the pipes 3 are located at a distance from each other defined by the first centre-to-centre distance X1.

However, the centre-to-centre distance X1, wherein the pipes 3 are in a condition of moving towards each other, preferably represents the minimum distance between the pipes 3 at which it is possible to perform their heating at the stations 5 and 6, which is required for the subsequent forming step.

The configuration shown in FIG. 4 is, on the other hand, relative to the same carriage 13 whilst it supports the same group G of three pipes 3, in which, however, the pipes 3 are located at a distance from each other defined by the second centre-to-centre distance X2.

However, the centre-to-centre distance X2, wherein the pipes 3 are in a spaced apart condition, preferably represents the minimum distance between the pipes 3 at which it is possible to perform, at the station 7, the forming of the bells on the relative ends 3a.

As may be clearly inferred from FIGS. 3 and 4, since the ends 3a shaped in the form of a bell involve a widening of the shape of the pipe 3, the minimum distance between the pipes 3 without ends 3a formed in the shape of a bell (and the relative centre-to-centre distance X1) is obviously less than the minimum distance between the pipes 3 equipped with ends 3a formed in the shape of a bell (relative centre-to-centre distance X2).

In short, by using the machine 1 and the method according to the invention, thanks to the positioning device 9 equipped with means 31 for movement of the pipes 3, it is possible to minimise the distance between the pipes 3 as a function of the various processing operations to which they must be subjected.

In other words, if the forming process to be performed at the station 7 requires a predetermined distance (centre-to-centre distance X2) between the pipes 3, thanks to the solution according to the invention it is possible, during the remaining processing steps, to position the pipes 3 in a condition where they are close together, at a smaller distance from each other (centre-to-centre distance X1).

Figure 11:
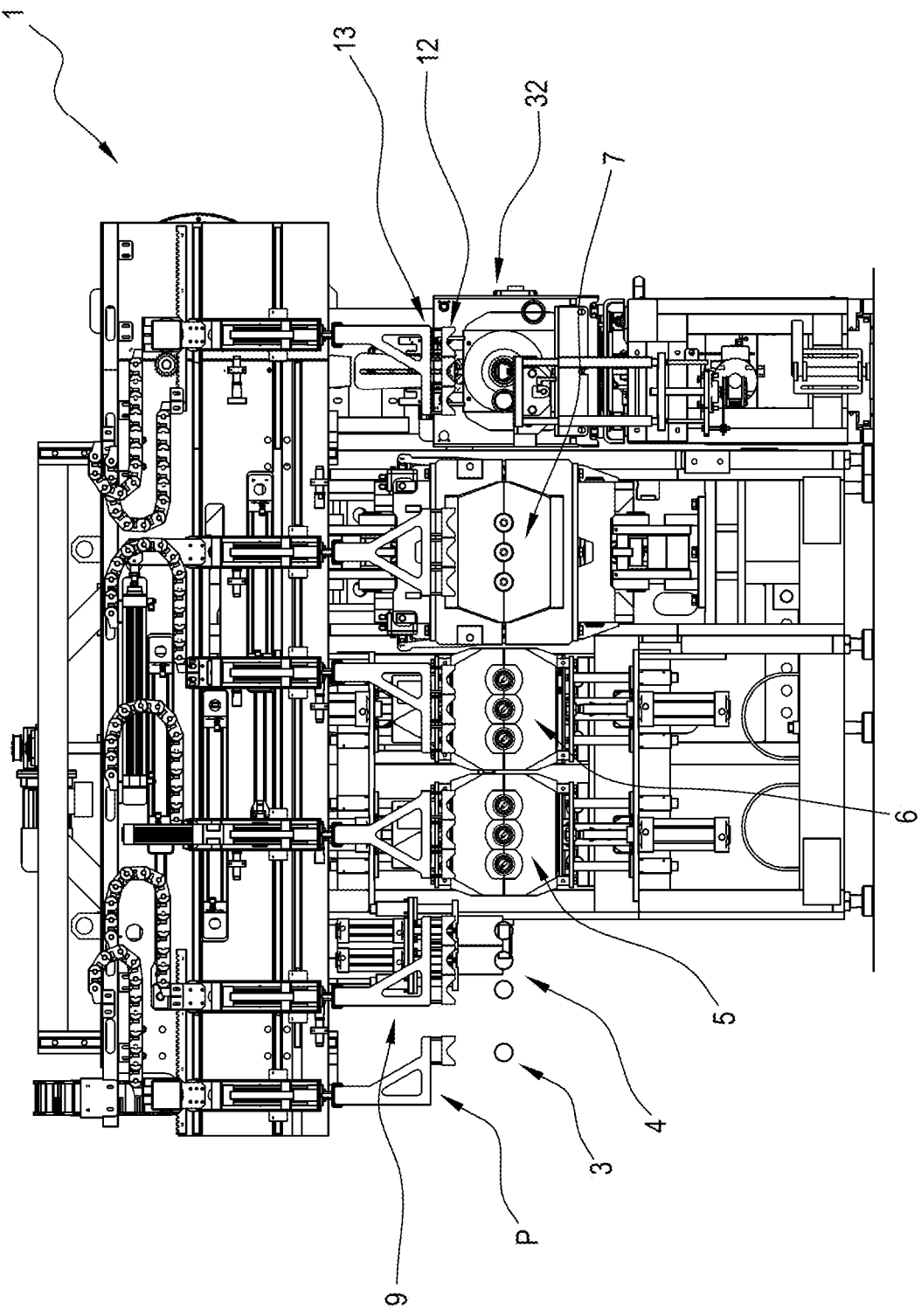
FIG. 11 is a schematic front elevation view, with some parts cut away to better illustrate others, of a variant embodiment of the machine of FIGS. 1 and 2.

In the variant embodiment illustrated in FIG. 11, the machine 1 comprises, unlike the machine embodiment described above with reference to FIGS. 1 and 2 (the description to which the reader is referred for all the remaining parts in common), positioned adjacent to the forming station 7, an operating station 32 for inserting a seal inside the bell.

In other words, at the operating station 32, of a substantially known type and not illustrated in detail, the step is performed for inserting a seal, not illustrated, in a suitable seat, also not illustrated, of the bell formed at the end of the pipe 3.

In this type of machine, the relative positioning device 9 comprises a specific carriage 13 equipped with relative rack 12 configured to move the pipes 3 from the forming station 7 to station 32 for inserting the seal.

The configuration of the apparatus for inserting the seal located in the relative operating station 32 is advantageously optimised, in terms of size and construction efficiency, by selecting a suitable centre-to-centre distance between the pipes 3 which is normally different from the one present at the forming station 7.

Also in this case, the solution according to the invention is advantageously applied for modifying the centre-to-centre distance between the pipes 3 before the step for inserting the seal in the bell.

More specifically, so as not to increase the working cycle time, also in this case it is advantageous perform the relative movement of the gripping elements 10 during the step of transferring the group G of pipes 3 from the forming station 7 to the operating station 32 for inserting the seal.

The solution according to the invention achieves the preset aims and brings important advantages.

Basically, thanks to the possibility of minimising the distance between the pipes 3 transported between the various stations, the machine 1 according to this invention also minimises the transversal size, that is, according to the second direction D2.

In effect, with the machine and the method according to the invention, the greater centre-to-centre distance X2 set between the pipes 3 by the apparatuses of the bell forming station 7 does not necessarily have to be reproduced also in the other accumulation and heating stations 4, 5, 6, as a smaller centre-to-centre distance X1 can be maintained in these stations and during the relative transfers.

A smaller overall size of the machine 1 in a transversal direction also results in a smaller path to be covered by each carriage 13 between one station and the other, thereby reducing, for the same transfer speed, the time necessary to complete the processing of the pipes 3.

The smaller overall size in a transversal direction obtained with the solution according to the invention therefore also allows an improved transportability of the machine and an easier relative installation in the extrusion line.

The achievement of a centre-to-centre distance X1 which is different to and less than the centre-to-centre distance X2 necessary due to the shape of the forming station 7 allows for a more compact configuration of the heating ovens installed in the stations 5 and 6.

This compact configuration is more advantageous since makes it possible to obtain a better energy efficiency with consequent lower operating costs resulting from electricity consumption. The ovens will even be lighter and therefore advantageous to achieve shorter times for moving the ovens during engagement of the ovens to and disengagement from the pipes being processed.

The belling machines are normally prepared for processing pipes of different diameters and thicknesses. The processing of the pipes of specific diameter and thickness is performed by equipping the machine, in the various stations (incoming, accumulation, heating and seal fitting), with suitable accessories shaped for the specific dimensions of the pipe. These accessories must be replaced when the dimensions of the pipes being processed are changed.

For example, typical belling machines designed to process drain pipes for buildings are able to process, equipped with suitable accessories, pipes with outside diameters of 32, 40, 50, 75, 90, 110, 125 and 160 mm. To increase the production capacity of the belling machine, without adversely affecting the overall dimensions and the distance between the various operating stations, is convenient to use the multi-belling process only for pipes with smaller diameters keeping in the belling machine the same number of processing stations and the same distance between them. Obviously, the greater the multiplicity of the processing the greater is the production capacity of the machine. Moreover, it is not convenient to make heating ovens which are large relative to the dimensions of the pipes because it would reduce the energy efficiency of the ovens (with the unnecessary heating of oversized metallic masses). It is also evident that the larger the oven relative to the dimensions of the pipe the greater will be the thermal losses.

The multiplicity of the belling is defined in the forming station by comparing the dimensions of the bell with the maximum dimensions of the moulds for forming bells which can be installed in the forming station, but it is also defined in the heating station by comparing the dimensions of the pipes with the maximum dimensions of the accessories of the oven which can be installed in the heating station. For example, with regard to the pipe diameter 75 mm, a triple belling could be feasible during the forming step with predetermined centre-to-centre distance X2, but, as a result of the smaller dimensions of the heating oven, three pipes with a centre-to-centre distance X2 might determine oven accessories which are too large to be installed in the oven of the heating station. Consequently, for this diameter, due to the dimensional limits imposed by the heating station, only the double belling is feasible in the belling machine.

With the solution according to the invention, a centre-to-centre distance X1 may, however, be advantageously imposed between the pipes constituting the group G in the heating stations which is less than X2, compatible with a heating of three pipes at a time; so, upon completion of the heating step (with the oven disengaged from the pipes), varying the centre-to-centre distance from X1 to X2, resulting in, consequently, the feasibility of processing with triple belling; all this with an increase in the production rate of the belling machine which, relative to the double belling, is potentially greater by 30%.

The invention claimed is:

1. A machine for conditioning pipes made of thermoplastic material, comprising:
a station for accumulating pipes made of thermoplastic material, at which the pipes are arranged side by side such that respective longitudinal axes of the pipes are parallel to each other and extend in a first direction, and the pipes have a spacing between each other in a second direction transverse to the first direction;
a plurality of operational stations for conditioning respective ends of the pipes, the operational stations comprising a station for forming bells on the ends,
a positioning device configured to pick up a group of the pipes for transferring the group from one of the stations to another of the stations, the positioning device comprising a rack configured to engage by gripping the group to retain the group during the transfer between the stations, the rack comprising a plurality of gripping elements, each configured to engage with one of the pipes of the group, wherein the positioning device comprises a movement device for relative movement of the gripping elements of the rack, the movement device being configured to vary, in the second direction, a spacing of the gripping elements and thus, the spacing of the pipes engaged with the gripping elements, between two of the stations.

2. The machine according to claim 1, wherein the positioning device comprises a carriage for supporting the rack, the carriage being movable on a respective track along the second direction, wherein the carriage comprises a frame for supporting the rack, at least one of the gripping elements being supported slidably by the frame.

3. The machine according to claim 2, wherein the rack comprises a plurality of runners connected to the gripping elements and the frame comprises a rectilinear portion defining a guide for sliding of at least one of the runners.

4. The machine according to claim 3, wherein the movement device comprises an actuator unit and a kinematic control mechanism operatively interposed between the actuator unit and the at least one of the runners slidable as one with one of the gripping elements.

5. The machine according to claim 4, wherein the kinematic control mechanism comprises an actuator rod connected to the actuator element and a connecting rod interposed between the rod and the at least one of the runners to induce in the at least one of the runners a sliding along the guide.

6. The machine according to claim 2, wherein the carriage comprises a plurality of racks aligned with each other in succession along the first direction, wherein each of the racks has a respective one of the gripping elements movable in synchrony with a corresponding one of the gripping elements of an adjacent one of the racks.

7. The device according to claim 4, wherein the actuator unit is a pneumatic actuator.

8. The device according to claim 4, wherein the actuator unit is an electrical actuator or a hydraulic actuator.

9. A method for conditioning a pipe made of thermoplastic material comprising the following steps:
feeding a plurality of pipes of equal diameter to an accumulation station,
placing the pipes in a group, positioned alongside each other such that respective longitudinal axes of the pipes are parallel to each other and the pipes have, in a direction transverse to the longitudinal axes, a spacing between each other of a first distance between adjacent ones of the longitudinal axes,
transferring the group to a first operational station at which the pipes are subjected to a first conditioning,
transferring the group from the first operational station to a second operational station at which each of the pipes is subjected to a second conditioning,
varying the spacing between the pipes of the group in the direction from the first distance to a second distance different from the first distance.

10. The method according to claim 9, wherein the step of varying the spacing between the pipes is actuated between one operational station for heating the pipes and an operational forming station, with a heated end of each of the pipes being shaped as a bell, the second distance being greater than the first distance.

11. The method according to claim 9, wherein the step of varying the spacing between the pipes is actuated between an operational forming station, with a heated end of each of the pipes being shaped as a bell, and an operational station for inserting a seal inside the bell.

12. The method according to claim 9, wherein the step of varying the spacing between the pipes of the group from the first distance to the second distance is performed during the transfer of the group of pipes from the first operational station to the second operational station.

* * * * *